United States Patent
Fischer et al.

(10) Patent No.: US 8,256,816 B2
(45) Date of Patent: Sep. 4, 2012

(54) GUIDE UNIT FOR A HEIGHT-ADJUSTABLE CARGO FLOOR AND MOTOR VEHICLE WITH SUCH A GUIDE UNIT AND A HEIGHT-ADJUSTABLE CARGO FLOOR

(75) Inventors: Wolfgang Fischer, Ginsheim-Gustavsburg (DE); Karsten Mau, Gross-Gerau (DE); Uwe Semmelmann, Fuerfeld (DE)

(73) Assignee: GM Global Technology Operations LLC, Detroit, MI (US)

( * ) Notice: Subject to any disclaimer, the term of this patent is extended or adjusted under 35 U.S.C. 154(b) by 83 days.

(21) Appl. No.: 12/676,569

(22) PCT Filed: Aug. 27, 2008

(86) PCT No.: PCT/EP2008/007004
§ 371 (c)(1),
(2), (4) Date: Sep. 3, 2010

(87) PCT Pub. No.: WO2009/033566
PCT Pub. Date: Mar. 19, 2009

(65) Prior Publication Data
US 2010/0320791 A1    Dec. 23, 2010

(30) Foreign Application Priority Data
Sep. 6, 2007 (DE) .......................... 10 2007 042 365

(51) Int. Cl.
*B60R 7/02* (2006.01)
(52) U.S. Cl. .................................. 296/24.44; 296/37.16

(58) Field of Classification Search ............... 296/37.16, 296/24.44
See application file for complete search history.

(56) References Cited

U.S. PATENT DOCUMENTS 3,911,832  A  * 10/1975  Vandergriff ................... 105/372
7,281,743  B2   10/2007  Weiland
2006/0016840 A1   1/2006  Svenson et al.

FOREIGN PATENT DOCUMENTS

| AT | 411743 B | 5/2004 |
| DE | 10225889 C1 | 12/2003 |
| DE | 10230205 B3 | 1/2004 |
| EP | 1728684 A1 | 12/2006 |
| EP | 1916135 A1 | 4/2008 |

(Continued)

OTHER PUBLICATIONS

International Searching Authority, International Search Report for Application No. PCT/EP2008/007004, dated Oct. 22, 2008.

(Continued)

*Primary Examiner* — Dennis Pedder
(74) *Attorney, Agent, or Firm* — Ingrassia Fisher & Lorenz P.C.

(57) ABSTRACT

A guide unit is provided for a height-adjustable cargo floor of a motor vehicle with a retaining part, to which a cargo floor can be fixed, and with a guide, along which the retaining part can be displaced from a lower position into an upper position. In addition, a spring element is provided for prestressing the retaining part into the topmost position. A motor vehicle is also provided with a height-adjustable cargo floor and at least one guide unit of the above-described type that is rigidly fixed to the vehicle.

16 Claims, 3 Drawing Sheets

FOREIGN PATENT DOCUMENTS

| | | | |
|---|---|---|---|
| EP | 2022674 | A1 | 2/2009 |
| FR | 2881387 | A1 | 8/2006 |
| FR | 2890636 | A1 | 3/2007 |
| FR | 2900612 | A1 | 11/2007 |
| JP | 2007091105 | A | 4/2007 |
| WO | 03095912 | A1 | 11/2003 |
| WO | 2011006577 | A1 | 1/2011 |

OTHER PUBLICATIONS

German Patent Office, German Search Report for Application No. 102007042365.8, dated Dec. 11, 2007.

* cited by examiner

GUIDE UNIT FOR A HEIGHT-ADJUSTABLE CARGO FLOOR AND MOTOR VEHICLE WITH SUCH A GUIDE UNIT AND A HEIGHT-ADJUSTABLE CARGO FLOOR

CROSS-REFERENCE TO RELATED APPLICATIONS

This application is a U.S. National-Stage entry under 35 U.S.C. §371 based on International Application No. PCT/EP2008/007004, filed Aug. 27, 2008, which was published under PCT Article 21(2) and which claims priority to German Application No. 102007042365.0, filed Sep. 6, 2007, which are all hereby incorporated in their entirety by reference.

TECHNICAL FIELD

The present invention pertains to a guide unit for a height-adjustable cargo floor of a motor vehicle with a retaining part, to which a cargo floor can be fixed, and with a guide, along which the retaining part can be displaced from a lower position into an upper position. The present invention furthermore pertains to a motor vehicle with a height-adjustable cargo floor and such a guide unit that is rigidly fixed to the vehicle.

BACKGROUND

In certain motor vehicles known from the state of the art, a height-adjustable cargo floor is provided above a cargo hold floor. Lateral guides are usually provided on the sidewalls of the cargo hold in order to adjust the known cargo floors from a lower position into an upper position. A person needs to exert a manual force upon the cargo floor in order to adjust this cargo floor from a lower position into an upper position or from an upper position into a lower position along the lateral guides. Known guides have the disadvantage that it is complicated to manipulate the cargo floor during the displacement into the different height positions. The manipulation of cargo floors with conventional guides is particularly complicated during the adjustment of the cargo floor from a lower position into an upper position.

Consequently, it is at least one objective of the present invention to develop a guide unit for a height-adjustable cargo floor of a motor vehicle that ensures a particularly simple manipulation of the cargo floor, especially when it is transferred from a lower position into an upper position. In addition, the invention aims to develop a motor vehicle with a height-adjustable cargo floor and at least one advantageous guide unit of this type that is rigidly fixed to the vehicle. Furthermore, other objectives, aims, desirable features, and characteristics will become apparent from the subsequent summary and detailed description, and the appended claims, taken in conjunction with the accompanying drawings and this background.

SUMMARY

The inventive guide unit for a height-adjustable cargo floor of a motor vehicle features a retaining part and a guide. Two such guide units may be rigidly fixed to the motor vehicle, for example, on the left and the right side within the motor vehicle cargo hold. The retaining part is designed in such a way that a cargo floor can be fixed thereto. For example, a corresponding receptacle for a protruding bolt of the cargo floor may be provided on the retaining part. The retaining part is furthermore arranged on the guide in such a way that it can be displaced from a lower position into an upper position along the guide. According to an embodiment of the invention, a spring element is provided for prestressing the retaining part into the topmost position.

The inventive guide unit provides the advantage that the spring element assists the person operating the cargo floor during the manual adjustment of the height-adjustable cargo floor into an upper position. This is advantageous because the force to be exerted by the person operating the cargo floor in order to adjust the cargo floor from a lower position into an upper position is reduced due to the fact that part of the required force is already applied by the prestressed spring element.

Although the cargo floor needs to be pressed downward against the prestressing force of the spring element during an adjustment of the cargo floor from an upper position into a lower position, this movement is supported by the weight of the cargo floor such that the advantages predominate.

In one preferred embodiment of the inventive guide unit, the spring element is arranged in such a way that at least a part of the prestressing force exerted upon the retaining part by the spring element in a lower position always acts in the direction of the guide, in which the topmost position of the retaining part is located. In this context, this direction refers to the direction of the guide, into which the retaining part needs to be displaced in order to reach the topmost position. In this embodiment, it is ensured that the movement of the retaining part into the topmost position is always supported by the prestressing force of the spring elements, namely regardless of the lower position, in which the retaining part is currently located. Due to these measures, the cargo floor can be manipulated in a particularly simple fashion.

In one particularly preferred embodiment of the inventive guide unit, the spring element is guided on the guide unit by means of a deflection element, wherein the deflection element is arranged in such a way that at least a part of the prestressing force exerted upon the retaining part by the spring element in a lower position always acts in the direction of the guide, in which the topmost position of the retaining part is located. Due to the utilization of a deflection element, the aforementioned function of the guide unit can be realized in a particularly simple and spaced-saving fashion.

In order to ensure that the deflection element does not or only slightly influence the intensity of the prestressing force applied by the spring element, the deflection element according to another preferred embodiment of the inventive guide unit is realized in the form of a deflection pulley, wherein the deflection pulley is preferably arranged on the guide unit in a rotatable fashion. This enables the spring element, for example, to roll on the circumference of the deflection pulley.

In one advantageous embodiment of the inventive guide unit, the spring element consists of a tension spring. A flat coil spring or an elastic band may be considered as a tension spring.

In another advantageous embodiment of the inventive guide unit, the guide features a first guide section that extends upward and an adjacent second guide section that extends horizontally. The horizontal arrangement of the second guide section ensures that the retaining part and therefore the height-adjustable cargo floor are downwardly supported in a particularly simple fashion. The person operating the cargo floor can also determine more easily whether the cargo floor or the retaining part is respectively located in a predetermined nominal position with a predetermined height.

In another advantageous embodiment of the inventive guide unit, the first guide section features a horizontal first partial guide section and an upwardly extending second partial guide section. The advantages of such a horizontal first partial guide section were already explained above.

In order to ensure a particularly uniform movement of the retaining part and therefore the cargo floor between the different positions, the first guide section according to another advantageous embodiment of the inventive guide unit extends at least partially in an arc-shaped fashion. This makes it possible to achieve, e.g., a smooth transition between the first guide section and the adjacent second guide section that extends horizontally. The manipulation of the cargo floor is much more comfortable due to these measures.

In another advantageous embodiment of the inventive guide unit, the second partial guide section extends in an arc-shaped fashion. In this case, it is possible, for example, to achieve a particularly smooth transition between the horizontally extending first partial guide section and the arc-shaped second partial guide section.

In another preferred embodiment of the inventive guide unit, the guide features a first junction between the first guide section and the second guide section, wherein a third guide section that extends further upward is connected to this first junction. Due to these measures, the second guide section defines an intermediate position, in which the cargo floor can be arranged, wherein this intermediate position does not correspond to the topmost position. Consequently, such a guide unit makes it possible to respectively arrange the cargo floor or the retaining part for the cargo floor in several predetermined upper or lower positions.

According to another advantageous embodiment of the inventive guide unit, the guide furthermore features a horizontal fourth guide section that is connected to the third guide section.

In order to allow a particularly uniform movement of the retaining part within the guide, another preferred embodiment of the inventive guide unit proposes that the first guide section and the second guide section are collectively realized in an essentially U-shaped fashion and/or the second guide section, the third guide section and the fourth guide section are collectively realized in an essentially U-shaped fashion.

In order to enable the person operating the cargo floor to determine whether the retaining part or the cargo floor is respectively located at one of the predetermined heights in a particularly simple fashion, another preferred embodiment of the inventive guide unit proposes that the first guide section or its first partial guide section, the second guide section and/or the fourth guide section are realized in the form of dead end sections with an end stop. The end stop may be realized, for example, by providing the aforementioned guide sections with a closed end. As soon as the retaining part comes in contact with the stop, the person operating the cargo floor knows that the desired predetermined position of the cargo floor or the retaining part has been reached.

In order to further simplify the manipulation of the cargo floor, the stops are arranged underneath one another in a vertical line in another preferred embodiment of the inventive guide unit.

In order to simplify the placement of the retaining part into the guide during the manufacture of the guide unit, the guide according to another preferred embodiment of the inventive guide unit furthermore features a fifth guide section that is realized in such a way that the retaining part can be engaged with and disengaged from the guide, wherein the fifth guide section is connected to one of the other guide sections. In this case, the fifth guide section may, as an exception, be arranged such that no part of the prestressing force exerted upon the retaining part by the spring element in a lower position acts in the direction of the guide, in which the topmost position of the retaining part is located, namely because this simplifies the placement of the retaining part into the guide.

According to another preferred embodiment of the inventive guide unit, the first guide section features a second junction between the first partial guide section and the second partial guide section, wherein the fifth guide section is connected to this second junction.

In order to prevent the retaining part from separating from the guide again after it was engaged therewith, means for closing the fifth guide section are provided in another particularly preferred embodiment of the inventive guide unit. These means may include, for example, the cover described below.

In order to largely protect the person operating the cargo floor from the moving parts of the guide unit, the guide unit according to another particularly preferred embodiment of the inventive guide unit furthermore features a cover, in which a second guide is provided that is essentially realized congruent to the first guide. For example, this second guide may be realized in such a way that the cargo floor can only be detached from the retaining part or fixed thereto in certain positions of the retaining part within the guide.

In another particularly advantageous embodiment of the inventive guide unit, the second guide does not feature a fifth guide section. Due to this measure, the retaining part guided in the first and in the second guide is prevented from returning into the fifth guide section of the first guide such that a detachment of the retaining part from the first guide is precluded. In this case, the cover or the second guide of the cover respectively serves as the means for closing the fifth guide section in the above-indicated fashion.

In another advantageous embodiment of the inventive guide unit, the cover is realized in such a way that the cargo floor can only be fixed to the retaining part or detached there from in the topmost position of the retaining part. This can be realized, for example, in that an outwardly open sixth guide section is connected to the fourth guide section of the second guide on the cover.

In another advantageous embodiment of the inventive guide unit, the retaining part is realized in such a way that the cargo floor can be fixed to the retaining part in a detachable fashion. This not only makes it possible to securely guide the cargo floor, but also to remove the cargo floor from the motor vehicle entirely.

In another preferred embodiment of the inventive guide unit, the retaining part is realized in such a way that the cargo floor can be fixed to the retaining part by pivoting the cargo floor about a hinge pin. Consequently, the guide unit makes it possible to securely guide the cargo floor, as well as to pivot the cargo floor.

The inventive motor vehicle features a height-adjustable cargo floor and at least one guide unit of the above-described type that is rigidly fixed to the vehicle, wherein the cargo floor is fixed to the retaining part.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
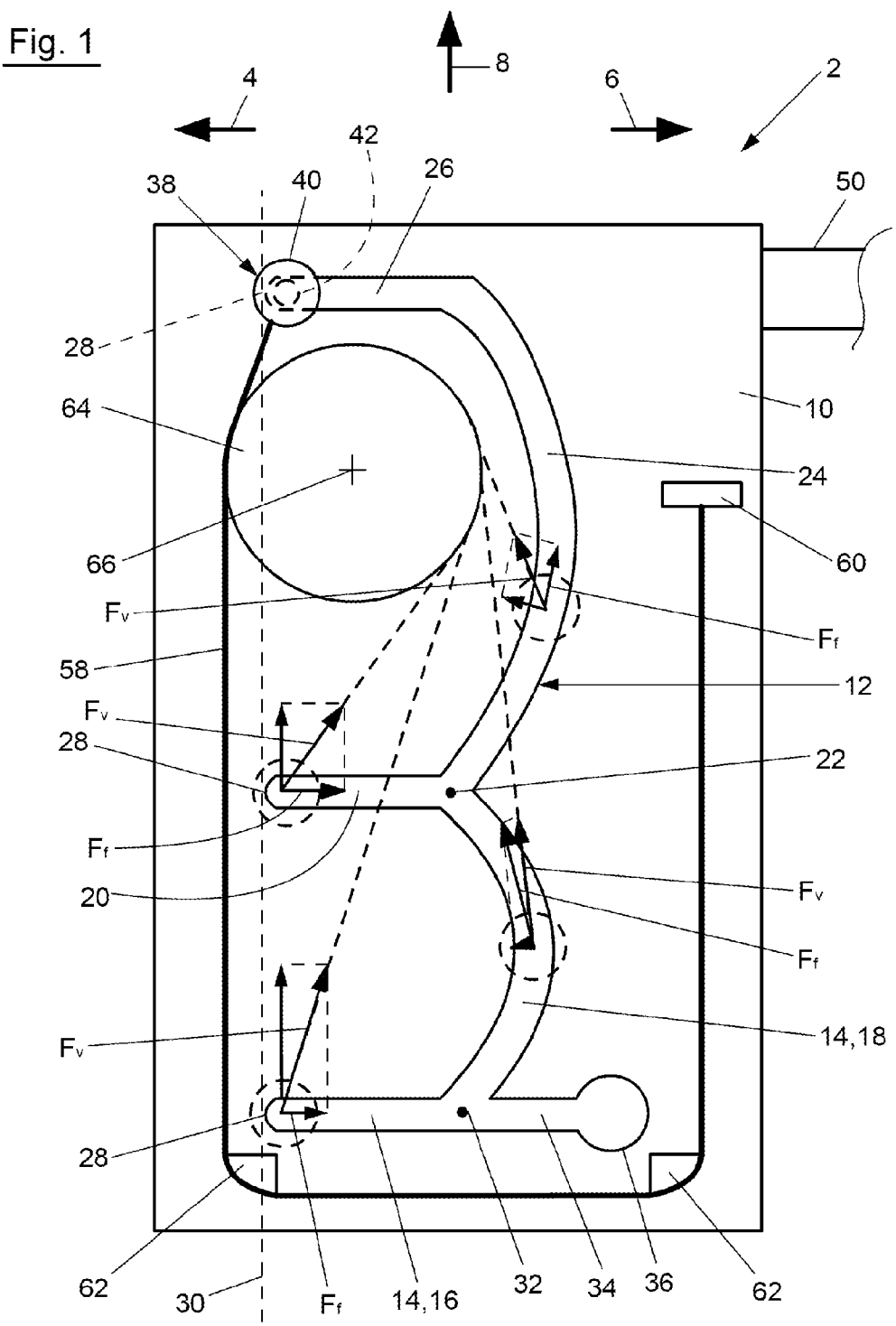
FIG. 1 shows a rear view of one embodiment of the inventive guide unit.
Figure 2:
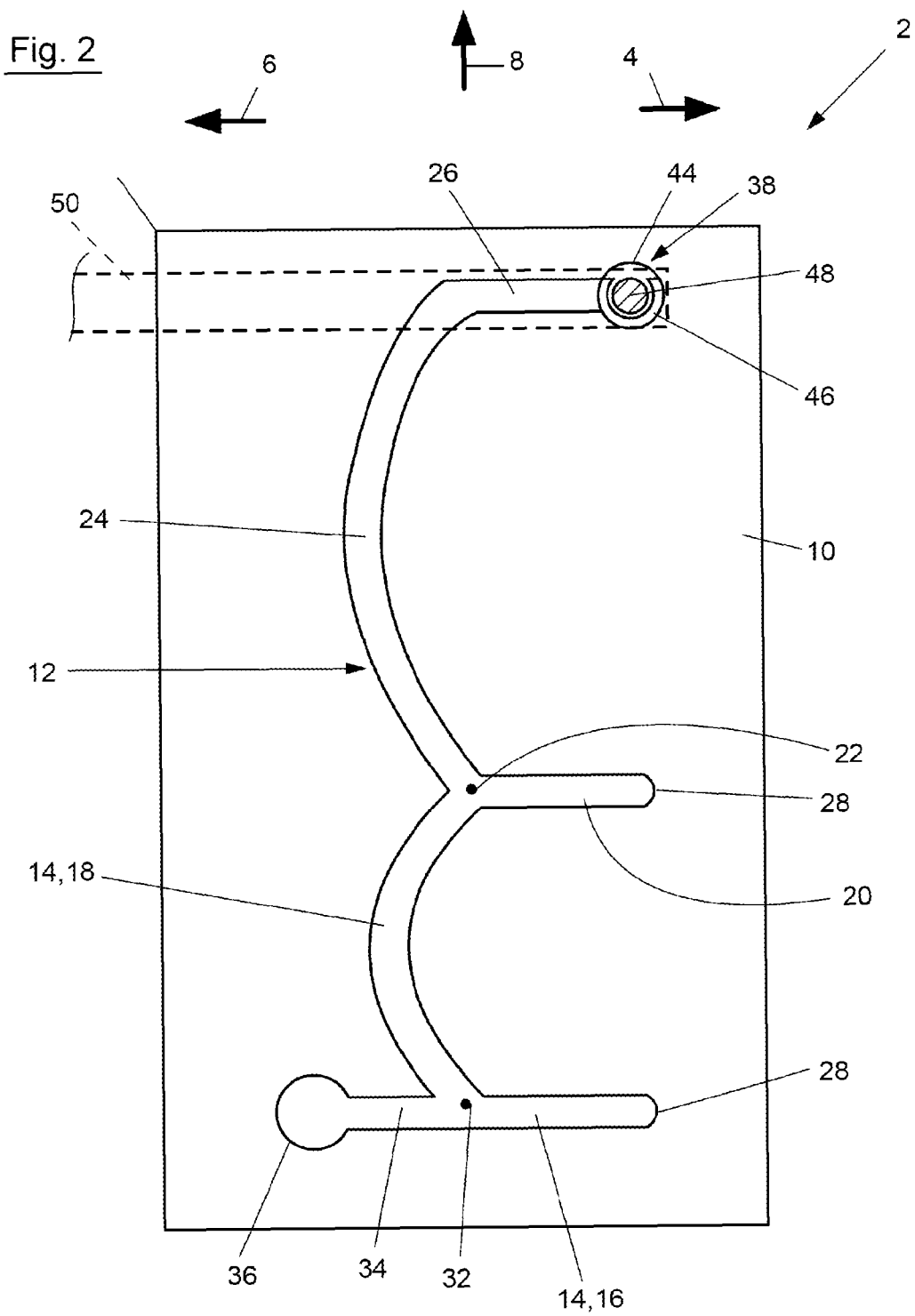
FIG. 2 shows a front view of the guide unit according to FIG. 1 without a cover.
Figure 3:
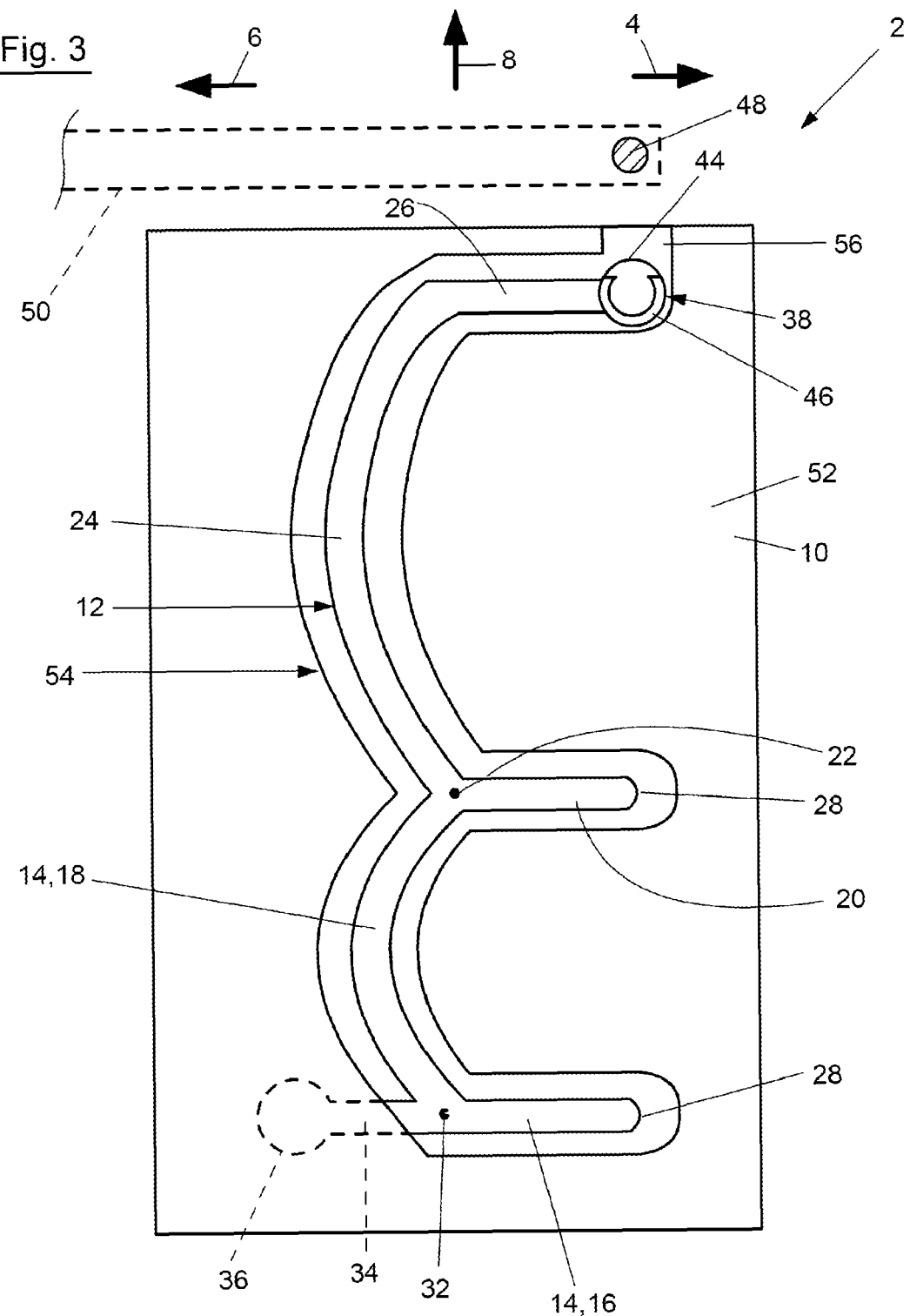
FIG. 3 shows a front view of the guide unit according to FIG. 1 with a cover.

FIG. 1 and FIG. 2, respectively, show a rear view and a front view of one embodiment of the inventive guide unit 2. In the installed state within the motor vehicle, the guide unit 2 may be arranged on a sidewall of the cargo hold, wherein the front side (FIG. 2) faces the cargo hold. A guide unit 2 should, in principle, be respectively arranged on both sidewalls of the cargo hold such that they lie opposite of one another in order to allow a secure and stable guidance of the cargo floor. The guide unit 2 illustrated in FIG. 1 to FIG. 3 consists—referred to the vehicle direction 4—of a left guide unit 2. A not-shown cargo hold opening of the motor vehicle is located opposite to the vehicle direction 4 in the direction 6. In FIG. 1 to FIG. 3, the vertical direction 8 of the motor vehicle in the installed state of the guide unit 2 is also indicated.

The guide unit 2 features a plate 10 that is fixed to the motor vehicle in the installed state of the guide unit 2. A guide 12 is provided in the plate 10, wherein the guide 12 is realized in the form of an elongated recess in the plate 10. The guide 12 comprises several guide sections. Referred to the vertical direction 8, the guide 12 features a lower first guide section 14. The first guide section 14 consists of a lower, horizontal first partial guide section 16 and a second partial guide section 18 that is arranged adjacent to the first partial guide section 16. The second partial guide section 18 extends upward in the vertical direction in an arc-shaped fashion. The arced shape of the second partial guide section 18 is realized in the form of a curvature of the second partial guide section 18 in the direction 6. A horizontal second guide section is arranged adjacent to the upwardly extending second partial guide section 18.

The guide 12 features a first junction 22 between the first guide section 14 and the second guide section 20. A third guide section 24 that extends further upward in the vertical direction 8 is connected to the first junction 22. The third guide section 24 is also curved in the direction 6 such that it also extends in an arc-shaped fashion analogous to the second partial guide section 18. Furthermore, a horizontal fourth guide section 26 is arranged adjacent to the third guide section 24.

The figures show that the first guide section 14 and the second guide section 21 are collectively realized in an essentially U-shaped fashion. Furthermore, the second guide section 20, the third guide section 24 and the fourth guide section 26 are also collectively realized in an essentially U-shaped fashion. The first guide section 14 or its first partial guide section 16, the second guide section 20 and the fourth guide section 26 are accordingly realized in the form of dead end sections with an end that points in the vehicle direction 4 and provided with end stops 28. In the installed state of the guide unit 2, the stops 28 are arranged underneath one another along a vertical line 30 that extends in the vertical direction 8.

A second junction 32 is provided between the first partial guide section 16 and the second partial guide section 18 of the first guide section 14. The guide 12 furthermore features a horizontal fifth guide section 34 that is connected to the second junction 32. The fifth guide section 34 is once again realized in the form of a dead end section that is provided with a widening 36 on its end, wherein the function of said widening is described further below.

The guide unit 2 furthermore comprises a retaining part 38 that can be displaced along the guide 12 from a lower position indicated with broken lines in FIG. 1 into an upper position. In FIG. 1 to FIG. 3, the retaining part 38 is arranged in the topmost position. The retaining part 38 features a rear section 40 that engages behind the rear side (FIG. 1) of the plate 10, a center section 42 that extends through the guide 12 and a front section 44 (FIG. 2 and FIG. 3) that engages behind the front side of the plate 10. The retaining part 38 is securely fixed in and can be displaced along the guide 12 in this fashion. The front section 44 is provided with a receptacle 46, in which the hinge pin 48 of a height-adjustable cargo floor 50 can be fixed in a detachable fashion as indicated in FIG. 2 and FIG. 3. The receptacle 46 does not restrict the pivot ability of the cargo floor 50 about the hinge pin 48.

In order to insert the retaining part 38 into the guide 12 during the manufacture of the guide unit 2, the retaining part 38 is initially placed into the widening 36 of the fifth guide section 34. This is possible because the widening 36 is larger than the rear section 40 and the front section 44 of the retaining part 38. After the insertion into the widening 36, the retaining part 38 is simply displaced in the direction of the second junction 32 such that the center section 42 of the retaining part 38 reaches the narrower region of the fifth guide section 34, in which the rear section 40 and the front section 44 engage behind the plate 10. The fifth guide section 34 is closed with suitable means once the retaining part 38 reaches the second junction 32. This ensures that the retaining part 38 can no longer be removed from the guide 12. According to FIG. 3, this is achieved in the present embodiment with the aid of a cover 52 on the front side of the guide unit 2.

A second guide 54 is provided in the cover 52 and essentially realized congruent to the first guide 12. However, the second guide 54 is wider than the first guide 12 such that the front section 44 of the retaining part 38 can be displaced therein. In contrast to the first guide 12, however, the second guide 54 does not feature a fifth guide section 34. The fifth guide section 34 of the first guide 12 is closed in this fashion, namely due to the fact that the front section 44 of the retaining part 38 contacts the edge of the second guide 54 in case the retaining part 38 is pushed in the direction of the fifth guide section 34.

In addition, the second guide 54 features a sixth guide section that is arranged adjacent to its fourth guide section, wherein this sixth guide section extends upward in the vertical direction 8 and is open on its upper end. Due to these measures, the hinge pin 48 of the cargo floor 50 can only be placed into the receptacle 46 on the front section 44 of the retaining part 38 from above via the sixth guide section 56 of the second guide 54 in the topmost position of the retaining part 38. In other positions of the retaining part 38, this is prevented by the cover 52.

According to FIG. 1, the retaining part 38 is prestressed in the topmost position, in which it contacts the stop 28 of the fourth guide section 26, with the aid of a spring element 58. The spring element 58 is schematically illustrated in FIG. 1 and realized in the form of a tension spring such as, for example, a rubber band or a flat coil spring. One end of the spring element is connected to the retaining part 38 while the other end of the spring element 58 is fixed to a mounting part 60 fixed to the rear side of the plate 10. The plate 10 is furthermore provided with stationary deflection parts 62, around which the spring element 58 is placed. A particularly long spring element can thusly be arranged on or in the guide unit 2 in a space-saving fashion. The spring element 58 extends over a deflection element 64 before it reaches the retaining part 38. The deflection element 64 is realized in the form of a deflection pulling that is arranged on the plate 10 of the guide unit 2 such that it is rotatable about a rotational axis 66. In this case, the spring element 58 extends over the circumference of the deflection element 64.

Due to the special arrangement of the deflection element 64, the spring element 58 is arranged in such a way that at least a part of the prestressing force exerted upon the retaining part 38 by the spring element 58 in a lower position always acts in the direction of the guide 12, in which the topmost position of the retaining part 38 is located. In FIG. 1, different lower positions of the retaining part 38 within the guide 12 are indicated with broken lines. A prestressing force Fv acts upon the retaining part 38 in each of the positions shown. The prestressing force Fv depends on the spring travel of the spring element 58 and acts in the direction, in which the spring element 58 extends. In each position of the retaining part 38, at least a partial force Ff acts in the direction of the guide 12, in which the retaining part 38 needs to be displaced within the guide 12 in order to reach the topmost position illustrated in FIG. 1 to FIG. 3. Due to this partial force Ff, the person operating the cargo floor is always supported during manual adjustments of the cargo floor 50 into a position located further toward the top, namely regardless of the position of the retaining part 38 within the guide 12, such that the manipulation of the cargo floor 50 is significantly simplified. Although the partial force Ff counteracts the movement of the retaining part 38 during a manual adjustment of the cargo floor 50 into a lower position, the manual lowering of the cargo floor 50 is much easier anyhow because the weight of the cargo floor 50 supports a downward movement.

In the present embodiment of the motor vehicle, the static load rating of the cargo floor 50 and the guide 12 is approximately 100 kg while the dynamic load rating of the cargo floor 50 and the guide 12 is approximately 300 kg.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A guide unit for a height-adjustable cargo floor of a motor vehicle, comprising:
   a retaining part to which the height-adjustable cargo floor can be fixed;
   a guide along which the retaining part can be displaced from a lower position into an upper position; and
   a spring element adapted to prestress the retaining part into a topmost position,
   a first guide section that extends upward and an second guide section adjacent to the first guide section that extends substantially horizontally,
   wherein the first guide section includes a horizontal first partial guide section and an upwardly extending second partial guide section and the first guide section at least partially extends in an arc-shaped fashion and the upwardly extending second partial guide section extends in the arc-shaped fashion.

2. The guide unit according to claim 1, wherein the spring element is arranged such that at least a part (Ff) of a prestressing force (Fv) exerted upon the retaining part by the spring element in a lower position acts in a direction of the guide in which the topmost position of the retaining part is located,
   wherein the spring element is adapted to be deflected over a deflection element on the guide unit, and
   wherein the deflection element includes a deflection pulley that is rotatably arranged on the guide unit.

3. The guide unit according to claim 1, wherein the spring element includes a tension spring.

4. The guide unit according to claim 1, further comprising:
   a first junction between the first guide section and the second guide section;
   a third guide section that extends upward and connected to the first junction; and
   a horizontal fourth guide section that is arranged adjacent to the third guide section.

5. The guide unit according to claim 1, wherein the first guide section and the second guide section are collectively realized in an essentially U-shaped fashion and/or the second guide section, the third guide section and the fourth guide section are collectively realized in an essentially U-shaped fashion.

6. The guide unit according to claim 4, wherein the first guide section and the second guide section each further comprise a dead end section having an end stop, wherein the end stops are arranged underneath one another in a vertical line.

7. The guide unit according to claim 4, further comprising a fifth guide section that is realized such that the retaining part is adapted to engaged with and disengaged from the guide,
   wherein the fifth guide section is connected to at least one of the first guide section, the second guide section, the third guide section, and the horizontal fourth guide section and the first guide section includes a second junction between the horizontal first partial guide section and the upwardly extending second partial guide section and the fifth guide section is connected to the second junction.

8. The guide unit according to claim 7, further comprising a closing device adapted to close the fifth guide section.

9. The guide unit according to claim 7, further comprising a cover in which a second guide is provided that is essentially realized congruent to the guide and the second guide does not include the fifth guide section.

10. The guide unit according to claim 9, wherein the cover is formed such that the height-adjustable cargo floor can only be associated with the retaining part in the topmost position of the retaining part.

11. The guide unit according to claim 1, wherein the height-adjustable cargo floor is detachably fixed to the retaining part.

12. A guide unit for a height-adjustable cargo floor of a motor vehicle, comprising:
   a retaining part to which the height-adjustable cargo floor can be fixed;
   a guide along which the retaining part can be displaced from a lower position into an upper position; and
   a spring element adapted to prestress the retaining part into a topmost position, wherein the height-adjustable cargo floor is fixable to the retaining part by pivoting the height-adjustable cargo floor about a hinge pin.

13. A motor vehicle, comprising:
   a retaining part;
   a height-adjustable cargo floor fixed to the retaining part; and
   a guide unit that is rigidly fixed to the motor vehicle, the guide unit comprising:
   a guide along which the retaining part can be displaced from a lower position into an upper position; and
   a spring element adapted to prestress the retaining part into a topmost position,
   wherein the spring element is arranged such that at least a part (Ff) of a prestressing force (Fv) exerted upon the retaining part by the spring element in a lower position acts in a direction of the guide in which the topmost position of the retaining part is located, wherein the spring element is adapted to guide be deflected over a deflection element on the guide unit, and wherein the deflection element includes a deflection pulley that is rotatably arranged on the guide unit.

14. The guide unit according to claim 6, wherein the horizontal fourth guide section comprises a dead end section with an end stop and the end stops are preferably arranged underneath one another in a vertical line.

15. The guide unit according to claim 4, wherein the second guide section, the third guide section, and the fourth guide section are collectively realized in an essentially U-shaped fashion.

16. The guide unit according to claim 13, wherein the spring element includes a tension spring.

* * * * *